Feb. 10, 1959 W. A. JONES ET AL 2,872,812
PRESSURE MEASURING MEANS
Filed Jan. 5, 1954 2 Sheets-Sheet 1

INVENTORS
WILLIAM A. JONES
JOSEPH F. HUFF
BY
Kenway, Jenney, Witter & Hildreth
ATTORNEYS Feb. 10, 1959   W. A. JONES ET AL   2,872,812
PRESSURE MEASURING MEANS
Filed Jan. 5, 1954

INVENTORS
WILLIAM A. JONES
JOSEPH F. HUFF
BY
Kenway, Jenney, Witter & Hildreth
ATTORNEYS

United States Patent Office 2,872,812
Patented Feb. 10, 1959

2,872,812
PRESSURE MEASURING MEANS

William A. Jones, Newtonville, and Joseph F. Huff, Hyde Park, Mass., assignors, by mesne assignments, to American Radiator & Standard Sanitary Corporation, New York, N. Y., a corporation of Delaware Application January 5, 1954, Serial No. 402,265

2 Claims. (Cl. 73—398)

This invention relates to pressure measuring devices and in particular to the combination of a novel form of pressure capsule and electrically responsive element so constructed as to produce an electrical signal as a function of change in pressure.

Conventional pressure gauges ordinarily depend upon linkages to transmit to an indicator the motion of an element sensitive to pressure. Consequently it is difficult to produce a reliable sturdy instrument capable of delicate pressure measurements, and particularly difficult to employ such instruments for the transmission of pressure changes to a remote indicator.

An important object of this invention is to increase the accuracy, reliability and efficiency of pressure measuring instruments.

Another object of the invention is to facilitate the transmission of intelligence from a pressure sensitive element to a remotely located indicator.

One important feature of the invention resides in a novel form of pressure sensitive capsule including a cell or chamber of non-circular cross-section surrounded by a tensioned conductor, the arrangement being such that deformation of the chamber in response to internal pressure effects variations in the length (and thus resistance) of the surrounding conductor.

Another feature of the invention comprises an electrical bridge circuit wherein one or more legs are provided by the conductor, thereby facilitating the construction of a circuit well adapted for long distance transmission of pressure-responsive indications.

An important advantage resulting from the practice of the invention is the fact that instruments of unusually small size and weight may inexpensively be produced without sacrifice of sturdiness and reliability.

Figure 1:
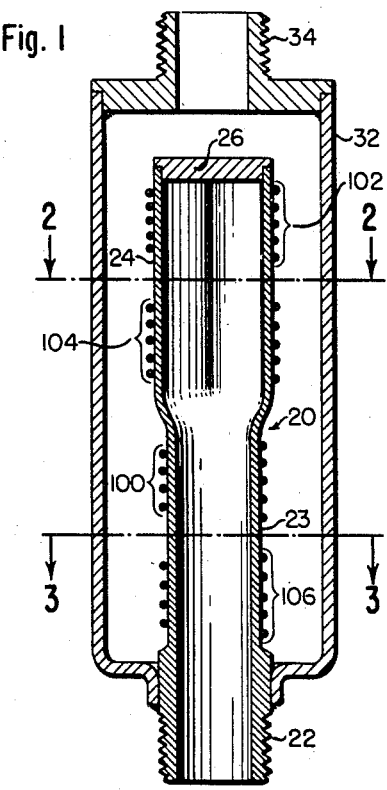
Figure 4:
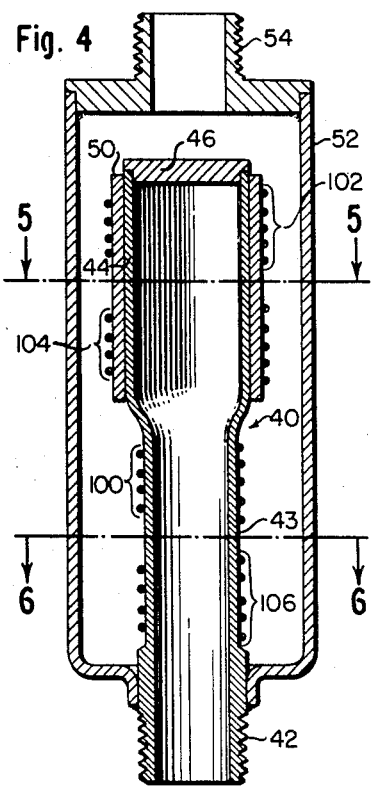
Figure 2:
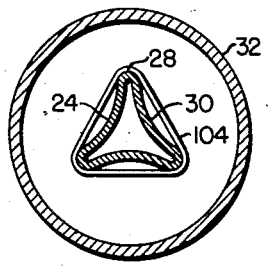
Figure 5:
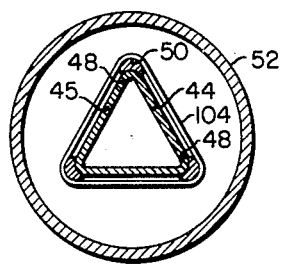
Figure 3:
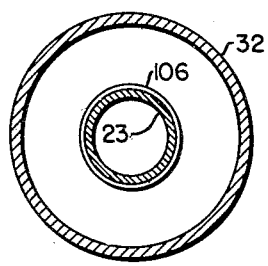
Figure 6:
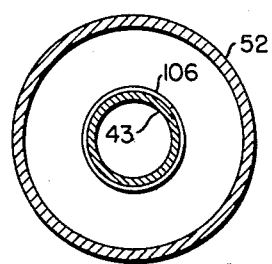
Figure 7:
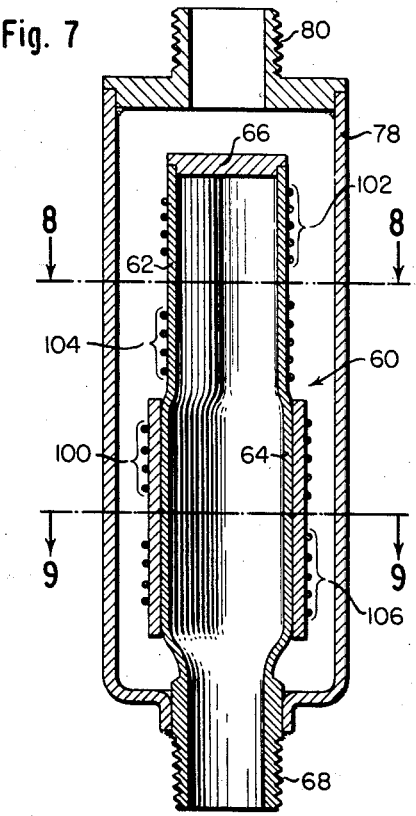
Figure 10:
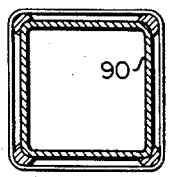
Figure 11:
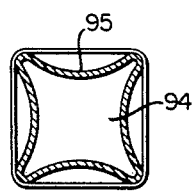
Figure 8:
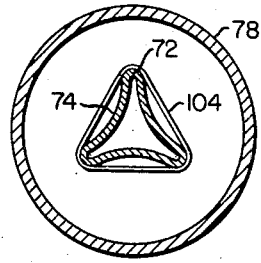
Figure 12:
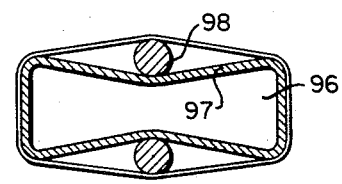
Figure 9:
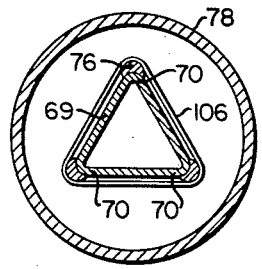
Figure 13:
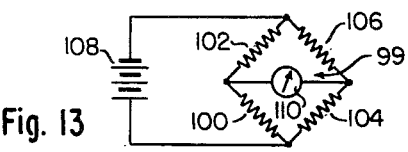

These and other objects and features of the invention, together with their incident advantages, will be more readily understood and appreciated from the following detailed description of preferred embodiments thereof selected for purposes of illustration and shown in the accompanying drawings, in which:

Fig. 1 is a view in sectional elevation of one form of a pressure gauge constructed in accordance with this invention, Figs. 2 and 3 are views in section taken along the corresponding section lines of Fig. 1, Fig. 4 is a view in sectional elevation of another form of a pressure gauge constructed in accordance with this invention, Figs. 5 and 6 are views in section taken along the corresponding section lines of Fig. 4, Fig. 7 is a view in sectional elevation of still another form of a pressure gauge constructed in accordance with this invention, Figs. 8 and 9 are views in section taken along the corresponding section lines of Fig. 7, Figs. 10, 11 and 12 are views in section of still other forms of pressure gauges constructed in accordance with this invention, and Fig. 13 is a schematic diagram of an electrical circuit which may be employed in this invention.

Proceeding now to a detailed description of the embodiment of this invention illustrated in Figs. 1–3, an elongated pressure capsule 20 closed at one end by a plug 26 is provided at its other end with a threaded inlet 22. The terminal portion 24 of the capsule 20 adjacent the plug 26 is formed in cross-section as a concave spherical triangle and smoothly merges into a shank portion 23 of reduced diameter and circular cross-section. The capsule 20 may be formed by machining a cylindrical piece of relatively resilient metal or by molding plastic or by any other suitable means.

The introduction of fluid under pressure into the capsule 20 through its threaded inlet 22 will exert a force within the portion 24 which will partially straighten the curved walls 30 and increase the distance between the corners 28 while the internal pressure in shank portion 23 will have little effect upon its diameter.

To measure the fluid pressure within the capsule 20 an electrical bridge circuit 99 illustrated in Fig. 13 is wound about the shank portion 23 and terminal portion 24 in the following manner.

Two opposite legs 102 and 104 of the bridge circuit are wound in tension about the portion 24 engaging only the corners 28 of the intersecting concave walls, and the two other opposite legs 100 and 106 of the bridge are wound about the shank portion 23. The legs 102 and 104 may be considered the active legs of the bridge, for the deforming effect upon them by the internal pressure within the capsule is considerable, while any deformation of legs 100 and 106 caused by said pressure is negligible. A battery 108 serves to energize the bridge circuit 99 and a galvanometer 110 connected across the bridge indicates the change in potential caused by variations in resistance of the active arms.

If it is desired to measure the fluid pressure in a line (not shown), the capsule 20 may be suitably attached thereto by means of its threaded inlet 22. The fluid is the line will flow into the capsule and exert internal pressure against the walls 30 which will tend to straighten them, and the corners 28 will move apart. The conductors 102 and 104 will be subjected to additional tension, stretching with the movement of the corners under the stress exerted in the capsule, thereby increasing in length and decreasing in cross sectional area. The resistance of conductors 102 and 104 will increase, and a change in potential across the bridge will be indicated by the galvanometer. It is apparent that the galvanometer may be readily calibrated to render direct pressure readings.

The pressure gauge thus far described may by the addition of a single element readily measure differential pressure. By enclosing capsule 20 in a cylinder 32 having a threaded inlet 34, an annular chamber formed about the capsule within the cylinder will serve as a means for applying a second fluid pressure against the walls of the capsule. The pressure exerted by the second fluid within the annular chamber wil have an effect upon the conduit 20, and more particularly upon triangular portion 24, opposite to that of the pressure within the capsule. The deformation of the terminal portion 24, therefore, will be the resultant of the oppositely applied pressures, and the net change in resistance of the conductors 102 and 104 will measure the differential pressure at the calibrated galvanometer.

Fig. 4 illustrates an alternative form of pressure gauge constructed in accordance with this invention. An elongated capsule 40 closed at one end by a plug 46 is provided at its other end with a threaded inlet 42. The terminal portion 44 of the capsule adjacent the plug 46 is triangular in cross section and smoothly merges into a shank portion 43 of reduced diameter and circular in cross section. Under the influence of fluid pressure within the pressure capsule 40 portion 44 will tend to approach cylindrical form. The walls 45 submitted to such pressure will bow outwardly, moving the corners 48 formed by the intersecting walls closer together.

To measure the pressure in the conduit, the bridge circuit 99 illustrated in Fig. 13 may be employed. Mounted longitudinally on each of the corners 43 are pins 50 which serve to hold the active legs 102 and 104 of the bridge circuit in unbonded relationship with the walls 45. The inactive conductors 100 and 106 of the bridge circuit may be wound about the cylindrical portion 43 of the capsule. The conductors 102 and 104 are wound in tension about the terminal portion 44 and will, under the influence of the presure within the capsule, decrease in length and increase in cross sectional area. The galvanometer 110 placed across the bridge will indicate the effect of the resulting decrease in resistance of the active legs on the bridge circuit.

To permit the gauge illustrated in Fig. 4 to measure differential pressure, an outer cylinder 52 having a threaded inlet 54 is positioned about the capsule 40, forming therewith an annular chamber. A second fluid may be introduced through the inlet 54 into the annular chamber and will exert a force against the walls 45 of portion 44 opposite to the force exerted by the fluid within the capsule. Consequently the change in resistance of the conductors 102 and 104 will result from the difference of the pressures exerted on the terminal portion.

The embodiment of this invention illustrated in Fig. 7 is merely the sum of the previously described embodiments, and is considered to be the preferred form of this invention. To increase the sensitivity of the pressure gauge, the four legs of the bridge circuit are subjected to changes in length and cross sectional area, each experiencing an appreciable change in resistance in response to the introduction of fluid under pressure into a capsule 60. The capsule 60 closed at one end by a plug 66 is provided at its other end with a threaded inlet 68. The terminal portion 62 of the capsule adjacent the closed end is formed in cross section as a concave spherical triangle and smoothly merges with an adjacent portion 64 of triangular cross section.

Upon the introduction of fluid under pressure into the capsule 60 the curved walls 74 defining the terminal portion 62 will tend to straighten, and the corners 72 formed by the intersection of the walls will move farther apart. At the same time the walls 69 of the adjacent portion 64 will bow outwardly, moving the corners 70 closer together.

To measure the pressure of the fluid, the bridge circuit shown in Fig. 13 once again may be employed. The opposite legs 102 and 104 of the bridge circuit 99 may be wound in tension about the terminal portion 62 while mounting pins 76 longitudinally disposed on the corners 70 will engage the opposite legs 100 and 106 of the bridge circuit wound in tension about the portion 64. The resistance of the legs 102 and 104 will increase and the resistance of the legs 100 and 106 will decrease as capsule 60 is deformed under the influence of the internal fluid pressure. The provision of four active legs in the bridge circuit 99 will greatly increase the response of the galvanometer, for it will be seen that the effect of the changes of resistance of all four legs is cumulative. To permit the measurement of differential pressure, the capsule 60 is enclosed in a cylinder 78 having a threaded inlet 80. The annular chamber formed by the cylinder 78 and the capsule 60 may receive a second fluid under pressure which will exert a force against the walls of the portions 62 and 64 opposite to the pressure applied by the fluid within the capsule. The change in resistance of the legs of the bridge 99 will result from the difference of the two fluid pressures.

Having thus described in detail three specific embodiments of this invention, numerous minor variations will be readily apparent to a man skilled in the art to which this invention pertains. For example, it is obvious that the pressure gauge of this invention need not be limited to a three-sided pressure responsive capsule. A four sided portion of the type illustrated in section in Figs. 10 and 11 may be employed. Square portion 90 will, with increase in pressure, decrease the resistance of a surrounding conductor while portion 94 defined by concave walls 95 will cause an increase in the resistance of a surrounding conductor with an increase in pressure within the capsule.

Fig. 12 illustrates in section what may be considered to be a two-sided capsule subject similarly to deformation from internal fluid presure. Pressure within the capsule 96 will attempt to straighten the curved walls 97 and the resistance of a conductor wound about the capsule will increase. From the foregoing it may be seen that any number of walls may define the non-cylindrical portion of the capsule and merely the sensitivity of the embodiments will vary in each configuration.

To render more sensitive a pressure gauge employing conductors adapted to increase in resistance with increases in fluid pressure, longitudinally disposed pins may be placed intermediate the sides of any or all of the curved walls. The pins 98 illustrated in Fig. 12 exemplify this use. Internal pressure in capsule 96 will, in addition to lengthening the surrounding conductor by virtue of the deformation of curved walls 97, increase the distance between pins 98, exerting an added stress on the conductor.

While the invention has been described with reference to a number of preferred embodiments, it will be appreciated by those skilled in the art that other modifications may be made without departing from the spirit of the invention. What we claim as new and desire to secure by Letters Patent of the United States is:

1. A pressure measuring means comprising a first chamber, a second chamber juxtaposed with said first chamber in fluid communication therewith, a plurality of concave walls defining said first chamber forming a plurality of longitudinally disposed corners at their intersections, a pair of electrical conductors wound in tension about said first chamber engaging each of said corners in unbonded relationship with said concave walls, a plurality of straight walls defining said second chamber joined together to form a second plurality of longitudinally disposed corners, mounting pins positioned externally of said second chamber longitudinally disposed on each of said second corners, a second pair of electrical conductors wound in tension about said second chamber engaging said mounting pins in unbonded relationship to said straight walls, all of said conductors together forming an electrical bridge circuit, means for introducing a fluid under pressure into each of said chambers whereby the pressure of said fluid will exert a force against said walls defining said chambers to alter the distance between the corners of said walls, and means electrically connected to said bridge circuit for measuring the effect of said pressure on said conductors.

2. A pressure measuring means characterized by claim 1 further characterized by a cylinder surrounding said first and second chambers forming therewith an annular compartment, and means for introducing a second fluid under pressure to said compartment whereby the means for measuring the electrical effect on said conductors will respond to the differential pressure of the two fluids.

References Cited in the file of this patent

UNITED STATES PATENTS

| | | |
|---|---|---|
| 2,365,015 | Simmons | Dec. 12, 1944 |
| 2,398,372 | Green | Apr. 16, 1946 |
| 2,420,148 | Ostergren | May 6, 1947 |
| 2,566,326 | Guillemin | Sept. 4, 1951 |
| 2,585,350 | Russell | Feb. 12, 1952 |
| 2,592,009 | Clement et al. | Apr. 8, 1952 |
| 2,663,781 | Rundell | Dec. 22, 1953 |
| 2,729,730 | Brady | Jan. 3, 1956 |